United States Patent
Kawada et al.

(10) Patent No.: US 10,591,509 B2
(45) Date of Patent: *Mar. 17, 2020

(54) TUNNEL CURRENT CONTROL APPARATUS AND TUNNEL CURRENT CONTROL METHOD

(71) Applicant: HAMAMATSU PHOTONICS K.K., Hamamatsu-shi, Shizuoka (JP)

(72) Inventors: Yoichi Kawada, Hamamatsu (JP); Hironori Takahashi, Hamamatsu (JP); Jun Takeda, Yokohama (JP); Ikufumi Katayama, Yokohama (JP); Yusuke Arashida, Yokohama (JP); Katsumasa Yoshioka, Yokohama (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,134

(22) Filed: Aug. 21, 2018

(65) Prior Publication Data
US 2019/0064209 A1 Feb. 28, 2019

(30) Foreign Application Priority Data
Aug. 23, 2017 (JP) .................. 2017-160104

(51) Int. Cl.
*G01Q 30/02* (2010.01)
*G01Q 60/30* (2010.01)
*G01Q 60/16* (2010.01)

(52) U.S. Cl.
CPC ............ *G01Q 30/02* (2013.01); *G01Q 60/16* (2013.01); *G01Q 60/30* (2013.01)

(58) Field of Classification Search
CPC ........ G01Q 30/02; G01Q 60/16; G01Q 60/30; H01S 1/02; G01N 21/3581; G02F 2203/13; H01J 2237/2818
See application file for complete search history.

(56) References Cited

U.S. PATENT DOCUMENTS

| | | | | |
|---|---|---|---|---|
| 7,718,969 B2* | 5/2010 | Zhang | ................ | G01N 21/3581 250/341.8 |
| 8,564,875 B2* | 10/2013 | Kawada | ................ | G02F 1/3534 250/504 R |

OTHER PUBLICATIONS

T. Balčiūnas, D. Lorenc, M. Ivanov, O. Smirnova, A. M. Zheltikov, D. Dietze, K. Unterrainer, T. Rathje, G. G. Paulus, A. Baltuška, and S. Haessler, "CEP-stable tunable THz-emission originating from laser-waveform-controlled sub-cycle plasma-electron bursts," Opt. Express 23, 15278-15289 (Jun. 2, 2015).*

(Continued)

*Primary Examiner* — Brooke Purinton
(74) *Attorney, Agent, or Firm* — Drinker Biddle & Reath LLP

(57) ABSTRACT

A tunnel current control apparatus includes a terahertz wave generation element configured to generate and output a terahertz wave pulse, a CEP adjustment unit configured to adjust a CEP of the terahertz wave pulse, and an off-axis parabolic mirror serving as a focusing element configured to focus the terahertz wave pulse in a gap between a first conductive object and a second conductive object. The CEP adjustment unit can arbitrarily adjust the CEP of the terahertz wave pulse.

8 Claims, 14 Drawing Sheets

(56) References Cited

OTHER PUBLICATIONS

Bai, Ya Nan et al. "Waveform-controlled terahertz radiation from the air filament produced by few-cycle laser pulses." Physical review letters 108 25 (Jun. 20, 2012): 255004.*
Tyler L. Cocker et al., "An ultrafast terahertz scanning tunnelling microscope," Nature Photonics, Aug. 2013, pp. 620-625, vol. 7.
Katsumasa Yoshioka et al., "Real-space coherent manipulation of electrons in a single tunnel junction by single-cycle terahertz electric fields," Nature Photonics, Dec. 2016, pp. 762-765, vol. 10.

* cited by examiner

TUNNEL CURRENT CONTROL APPARATUS AND TUNNEL CURRENT CONTROL METHOD

BACKGROUND OF THE INVENTION

Field of the Invention

The present invention relates to an apparatus and a method for controlling a tunnel current flowing between a first conductive object and a second conductive object.

Related Background Art

Non-Patent Document 1 describes that a tunnel current flows between a tip of a probe and an observation object by focusing a terahertz wave pulse in a gap between the tip of the probe and the observation object in a scanning tunneling microscope (STM). When utilizing this technique, it is possible to cause a tunnel current to flow between the tip of the probe and the observation object by focusing the terahertz wave pulse into the gap between the tip of the probe and the observation object in addition to or in place of applying a voltage between the probe and the observation object as in the conventional STM, further, it is possible to observe a structure of a surface of the observation object when the tunnel current is measured by scanning the probe relative to the observation object. Such an STM is referred to as a THz-STM.

Non-Patent Document 2 describes that a magnitude and a direction of a tunnel current flowing when a terahertz wave pulse is focused in a gap between a tip of a probe and an observation object are dependent on a carrier envelope phase (CEP) of the terahertz wave pulse. In this document, the CEP of the terahertz wave pulse is changed by inserting a pair of spherical lenses or a pair of cylindrical lenses on an optical path of the terahertz wave pulse. That is, with reference to the CEP of the terahertz wave pulse when the pair of spherical lenses and the pair of cylindrical lenses are not inserted, the CEP of the terahertz wave pulse is shifted by $\pi/2$ by inserting the pair of cylindrical lenses, and further, the CEP of the terahertz wave pulse is shifted by it by inserting the pair of spherical lenses.

Here, a terahertz wave is an electromagnetic wave having a frequency of about 0.01 THz to 100 THz corresponding to an intermediate region between a light wave and a radio wave, and has an intermediate property between the light wave and the radio wave. Further, the CEP indicates a relation of a phase of an electric field oscillation (carrier) in a light pulse with respect to a shape (envelope) of a temporal change of an amplitude of the light pulse in techniques utilizing ultrashort pulses such as femtosecond laser light pulses and terahertz wave pulses. A CEP of a light pulse of linearly polarized light is defined by a phase of an electric field at a peak position of an amplitude of the light pulse. Further, a CEP of a light pulse of circularly polarized light can be defined by a direction of an electric field vector at a peak position of an amplitude of the light pulse.

When utilizing the generation of the tunnel current caused by focusing the terahertz wave pulse, it is expected that time-resolved measurement of single molecular vibration becomes possible, and further, it is also expected that verification of a screening effect in semiconductors becomes possible. In addition, when utilizing the fact that the magnitude and the direction of the tunnel current in an extremely minute region can be controlled at an extremely high speed, it is expected to realize an electronic device such as a transistor using ultra-high-speed electronic control, for example, and an application such as precision processing of a minute region is also expected.

Non-Patent Document 1: T. L. Cocker, et al., "An ultrafast terahertz scanning tunnelling microscope", Nat. Photon. Vol. 7, pp. 620-625 (2013)

Non-Patent Document 2: K. Yoshioka, et al., "Real-space coherent manipulation of electrons in a single tunnel junction by single-cycle terahertz electric fields", Nat. Photon. Vol. 10, pp. 762-765 (2016)

SUMMARY OF THE INVENTION

The present inventors have further conducted studies regarding the tunnel current generated by focused irradiation with terahertz wave pulses and obtained the following findings. That is, the CEP of the terahertz wave pulse focused in the gap between the tip of the probe and the observation object is sometimes different from an intended CEP, and such a difference depends on a shape of the tip of the probe. As a result, the tunnel current actually flowing between the tip of the probe and the observation object is sometimes different from an intended value.

These facts are applied not only to the tunnel current flowing between the tip of the probe and the observation object in the THz-STM but also to a tunnel current generally flowing due to a tunnel effect between a first conductive object and a second conductive object.

The present invention has been made based on the findings of the present inventors, and an object thereof is to provide an apparatus and a method capable of accurately controlling a tunnel current flowing between a first conductive object and a second conductive object.

A tunnel current control apparatus according to the present invention is an apparatus for controlling a tunnel current flowing between a first conductive object and a second conductive object, and includes (1) a terahertz wave generation element configured to generate and output a terahertz wave pulse; (2) a CEP adjustment unit configured to input the terahertz wave pulse output from the terahertz wave generation element, adjust a CEP of the input terahertz wave pulse, and output the terahertz wave pulse after the CEP adjustment; and (3) a focusing element configured to input the terahertz wave pulse output from the CEP adjustment unit, and focus the input terahertz wave pulse in a gap between the first conductive object and the second conductive object.

Further, in the above tunnel current control apparatus, the CEP adjustment unit includes (a) a circularly polarized light pulse generation element configured to input the terahertz wave pulse output from the terahertz wave generation element, and output the terahertz wave pulse as circularly polarized light; (b) a half-wave plate configured to input the terahertz wave pulse output from the circularly polarized light pulse generation element, be rotatable about an axis parallel to an input direction, and output the terahertz wave pulse having the CEP corresponding to a rotation direction; and (c) a linearly polarized light pulse generation element configured to input the terahertz wave pulse output from the half-wave plate, and output the terahertz wave pulse as linearly polarized light.

A tunnel current control method according to the present invention is a method for controlling a tunnel current flowing between a first conductive object and a second conductive object, and includes (1) a generation step of, by a terahertz wave generation element, generating and outputting a terahertz wave pulse; (2) a CEP adjustment step of, by a CEP adjustment unit configured to input the terahertz wave pulse output from the terahertz wave generation element, adjusting a CEP of the input terahertz wave pulse, and outputting the terahertz wave pulse after the CEP adjustment; and (3) a focusing step of, by a focusing element configured to input the terahertz wave pulse output from the CEP adjustment unit, focusing the input terahertz wave pulse in a gap between the first conductive object and the second conductive object.

Further, in the above tunnel current control method, in the CEP adjustment step, (a) a circularly polarized light pulse generation element configured to input the terahertz wave pulse output from the terahertz wave generation element is used to output the terahertz wave pulse as circularly polarized light, (b) a half-wave plate configured to input the terahertz wave pulse output from the circularly polarized light pulse generation element, and be rotatable about an axis parallel to an input direction is used to output the terahertz wave pulse having the CEP corresponding to a rotation direction, and (c) a linearly polarized light pulse generation element configured to input the terahertz wave pulse output from the half-wave plate is used to output the terahertz wave pulse as linearly polarized light.

According to the present invention, it is possible to accurately control the tunnel current flowing between the first conductive object and the second conductive object.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION

Hereinafter, embodiments for carrying out the present invention will be described in detail with reference to the accompanying drawings. In the description of the drawings, the same elements will be denoted by the same reference signs, and redundant descriptions will be omitted. The present invention is not limited to these examples.

Figure 1:
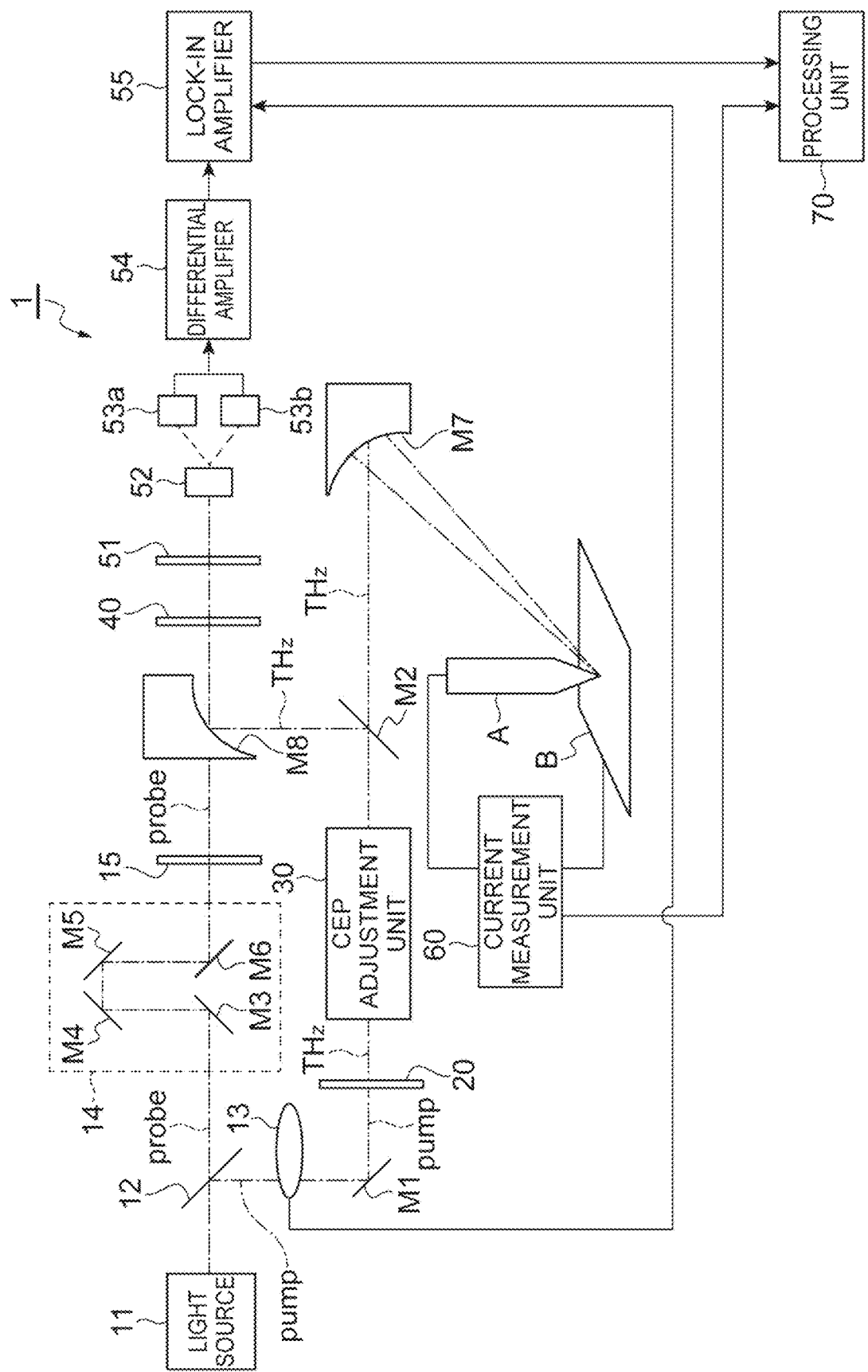
FIG. 1 is a diagram illustrating a configuration of a terahertz wave system 1 including a tunnel current control apparatus.

FIG. 1 is a diagram illustrating a configuration of a terahertz wave system 1 including a tunnel current control apparatus. The tunnel current control apparatus of the present embodiment includes a terahertz wave generation element 20 configured to generate and output a terahertz wave pulse, a CEP adjustment unit 30 configured to adjust a CEP of the terahertz wave pulse, and an off-axis parabolic mirror M7 serving as a focusing element configured to focus the terahertz wave pulse in a gap between a first conductive object A and a second conductive object B. The terahertz wave system 1 illustrated in FIG. 1 has other configurations in addition to the configuration of the tunnel current control apparatus.

The terahertz wave system 1 includes a light source 11, a branching unit 12, a chopper 13, an optical path difference adjustment unit 14, a polarizer 15, the terahertz wave generation element 20, the CEP adjustment unit 30, a terahertz wave detection element 40, a quarter-wave plate 51, a polarization separation element 52, photodetectors 53a and 53b, a differential amplifier 54, a lock-in amplifier 55, a current measurement unit 60, a processing unit 70, mirrors M1 to M6, and off-axis parabolic mirrors M7 and M8.

The light source 11 outputs pulsed light with a constant repetition period, and is preferably a femtosecond pulsed laser light source that outputs a light puke having a pulse width of about femtosecond. The branching unit 12 is, for example, a beam splitter, and branches the light pulse output from the light source 11, outputs one of the branched light pulses as a pump light pulse to the mirror M1, and outputs the other as a probe light pulse to the mirror M3.

The chopper 13 is provided on an optical path of the pump light pulse between the branching unit 12 and the mirror M1 and alternately repeats passing and blocking of the pump light pulse with a constant period. The pump light pulse output from the branching unit 12 and passed through the chopper 13 is reflected by the mirror M1 and input to the terahertz wave generation element 20. Here, an optical system of the pump light pulse from the branching unit 12 to the terahertz wave generation element 20 will be referred to as "a pump optical system" hereinafter.

The terahertz wave generation element 20 generates and outputs a terahertz wave pulse by inputting the pump light pulse. The terahertz wave generation element 20 is configured to include, for example, any one of a non-linear optical crystal (for example, ZnTe), a photoconductive antenna element (for example, an optical switch using GaAs), a semiconductor (for example, InAs), and a superconductor.

When the terahertz wave generation element 20 includes the non-linear optical crystal, the terahertz wave generation element 20 can generate a terahertz wave pulse by a non-linear optical phenomenon occurring with incidence of pump light pulse.

The terahertz wave pulse is an electromagnetic wave having a frequency of about 0.01 THz to 100 THz corresponding to an intermediate region between a light wave and a radio wave, and has an intermediate property between the light wave and the radio wave. Further, the terahertz wave pulse is generated with a constant repetition period, and a pulse width is on the order of a few picoseconds.

The CEP adjustment unit 30 inputs the terahertz wave pulse output from the terahertz wave generation element 20, adjusts a CEP of the input terahertz wave pulse, and outputs a terahertz wave pulse after the CEP adjustment. Details of the CEP adjustment unit 30 will be described later.

The mirror M2 is inserted on an optical path of the terahertz wave pulse output from the CEP adjustment unit 30 and is provided to be removable from the optical path. When the mirror M2 is removed from the optical path, the off-axis parabolic mirror M7 serving as a focusing element inputs the terahertz wave pulse output from the CEP adjustment unit 30 and focuses the input terahertz wave pulse in a gap between a first conductive object A and a second conductive object B. Here, in FIG. 1, the first conductive object A is illustrated as a probe having a shape in which a tip opposing the second conductive object B is sharp and pointed.

When the mirror M2 is inserted on the optical path, the terahertz wave pulse output from the CEP adjustment unit 30 is reflected by the mirror M2, and then, is further reflected by the off-axis parabolic mirror M8. Here, the optical system of the terahertz wave pulse from the terahertz wave generation element 20 to a reflection surface of the off-axis parabolic mirror M8 via the mirror M2 at this time will be referred to as "a terahertz wave optical system" hereinafter.

Meanwhile, the probe light pulse output from the branching unit 12 is sequentially reflected by the mirrors M3 to M6, passes through the polarizer 15, and is input to the off-axis parabolic mirror M8. A through hole through which the probe light pulse passes is provided in the off-axis parabolic mirror M8, and the probe light pulse that has passed through the through hole is combined with the terahertz wave pulse on the reflection surface of the off-axis parabolic mirror M8. That is, the off-axis parabolic mirror M8 acts as a combining unit that combines the probe light pulse and the terahertz wave pulse. Here, an optical system of the probe light pulse from the branching unit 12 to the reflection surface of the off-axis parabolic mirror M8 will be referred to as "a probe optical system" hereinafter.

The four mirrors M3 to M6 constitute the optical path difference adjustment unit 14. That is, as the mirrors M4 and M5 are moved, an optical path length between the mirror M3 and the mirror M4 is adjusted, an optical path length between the mirror M5 and the mirror M6 is adjusted, and as a result, an optical path length of the probe optical system is adjusted. That is, the optical path difference adjustment unit 14 can adjust a difference between the optical path length of the pump optical system and the terahertz wave optical system from the branching unit 12 to the reflection surface of the off-axis parabolic mirror M8 and the optical path length of the probe optical system from the branching unit 12 to the reflection surface of the off-axis parabolic mirror M8.

The off-axis parabolic mirror M8 inputs the terahertz wave pulse output from the terahertz wave generation element 20 and reaching via the CEP adjustment unit 30 and the mirror. M2 and the probe light pulse output from the branching unit 12 and reaching. Further, the off-axis parabolic mirror M8 combines the input terahertz wave pulse and the probe light pulse so as to be coaxial with each other, and outputs to the terahertz wave detection element 40.

The terahertz wave detection element 40 detects a correlation between the terahertz wave pulse and the probe light pulse. The terahertz wave detection element 40 includes, for example, any one of an electro-optic crystal and a photo-conductive antenna element. When the terahertz wave detection element 40 includes the electro-optic crystal, the terahertz wave detection element 40 inputs the terahertz wave pulse and the probe light pulse reaching from the off-axis parabolic mirror M8, changes a polarization state of the probe light pulse by birefringence, the birefringence induced by the Pockets effect along with propagation of the terahertz wave pulse, and outputs the probe light pulse. Since the amount of birefringence at this time depends on an electric field intensity of the terahertz wave pulse, the amount of the change in the polarization state of the probe light pulse in the terahertz wave detection element 40 depends on the electric field intensity of the terahertz wave pulse.

The polarization separation element 52 is, for example, a Wollaston prism. The polarization separation element 52 inputs the probe light pulse output from the terahertz wave detection element 40 and passed through the quarter-wave plate 51, separates the input probe light pulse into two polarization components orthogonal to each other, and outputs the components. The photodetectors 53a and 53b include, for example, photodiodes, detect powers of the two polarization components of the probe light pulse obtained by the polarization separation using the polarization separation element 52, and output electric signals having values corresponding to the detected powers to the differential amplifier 54.

The differential amplifier 54 inputs the electric signals output from the photodetectors 53a and 53b, respectively, and outputs an electric signal having a value corresponding to a difference between the values of both the electric signals to the lock-in amplifier 55. The lock-in amplifier 55 synchronously detects the electric signal output from the differential amplifier 54 at a repetition frequency of transmitting and blocking of the pump light pulse in the chopper 13. The signal output from the lock-in amplifier 55 has a value that depends on the electric field intensity of the terahertz wave pulse. In this manner, it is possible to detect the correlation between the terahertz wave pulse and the probe light pulse and detect an electric field waveform of a far field terahertz wave pulse propagating in a free space before being focused. Therefore, it is possible to detect an actual CEP of the terahertz wave pulse in the far field.

Specifically, the electric field waveform of the far field terahertz wave pulse is detected as follows. The light pulse output from the light source 11 is branched into a pump light pulse and a probe light pulse by the branching unit 12. The pump light pulse output from the branching unit 12 is reflected by the mirror M1 and input to the terahertz wave generation element 20. In the terahertz wave generation element 20, a terahertz wave pulse is generated and output in accordance with the input of the pump light pulse. The terahertz wave pulse output from the terahertz wave generation element 20 is subjected to CEP adjustment by the CEP adjustment unit 30, and is input to the off-axis parabolic mirror M8 via the mirror M2. Meanwhile, the probe light pulse output from the branching unit 12 is sequentially reflected by the minors M3 to M6, is converted to linearly polarized light by the polarizer 15, and is input to the off-axis parabolic mirror M8.

The terahertz wave pulse and the probe light pulse input to the off-axis parabolic mirror M8 are combined by the off-axis parabolic mirror M8 so as to be coaxial with each other, and then, input to the terahertz wave detection element 40 at substantially the same timing. In the terahertz wave detection element 40 to which the terahertz wave pulse and the probe light pulse have been input, the birefringence is induced along with the propagation of the terahertz wave pulse, and the polarization state of the probe light pulse changes due to the birefringence. Then, the polarization state of the probe light pulse in the terahertz wave detection element 40 is detected by the quarter-wave plate 51, the polarization separation element 52, the photodetector 53a, the photodetector 53b, the differential amplifier 54, and the lock-in amplifier 55. In this manner, the change of the polarization state of the probe light pulse in the terahertz wave detection element 40 is detected, and as a result, an electric field amplitude of the terahertz wave pulse is detected.

Further, a difference in timing between the terahertz wave pulse and the probe light pulse input to the terahertz wave detection element 40 is adjusted by the optical path difference adjustment unit 14. As described above, in general, the pulse width of the probe light pulse is on the order of femtoseconds while the pulse width of the terahertz wave pulse is on the order of picoseconds, and the pulse width of the probe light pulse is narrower than that of the terahertz wave pulse by several orders of magnitude. Accordingly, a temporal waveform of an electric field amplitude of the terahertz wave pulse is obtained as an incident timing of the probe light pulse to the terahertz wave detection element 40 is swept by the optical path difference adjustment unit 14. In this manner, the electric field waveform of the far field terahertz wave pulse is detected, and further, the actual CEP of the terahertz wave pulse is detected.

The current measurement unit 60 measures a tunnel current flowing between the first conductive object A and the second conductive object B due to focusing of the terahertz wave pulse in the gap between the first conductive object A and the second conductive object B. The tunnel current is obtained as a time integral value for each pulse. For example, when the number of electrons moving between the first conductive object A and the second conductive object B due to the tunnel effect are equal to each other in a positive direction and a negative direction during certain one pulse irradiation period of the terahertz wave pulse, the tunnel current measured in the one pulse irradiation period has a value 0. Further, the number of moving electrons described later corresponds to the tunnel current value.

The processing unit 70 inputs the electric field waveform and the CEP of the far field terahertz wave pulse detected based on an output signal from the lock-in amplifier 55. Further, the processing unit inputs the tunnel current value measured by the current measurement unit 60. The processing unit 70 inputs the electric field waveform and the CEP of the far field terahertz wave pulse and the tunnel current value obtained for each value of the CEP adjustment by the CEP adjustment unit 30, and processes these pieces of input data. A processing example will be described later.

Figure 2:
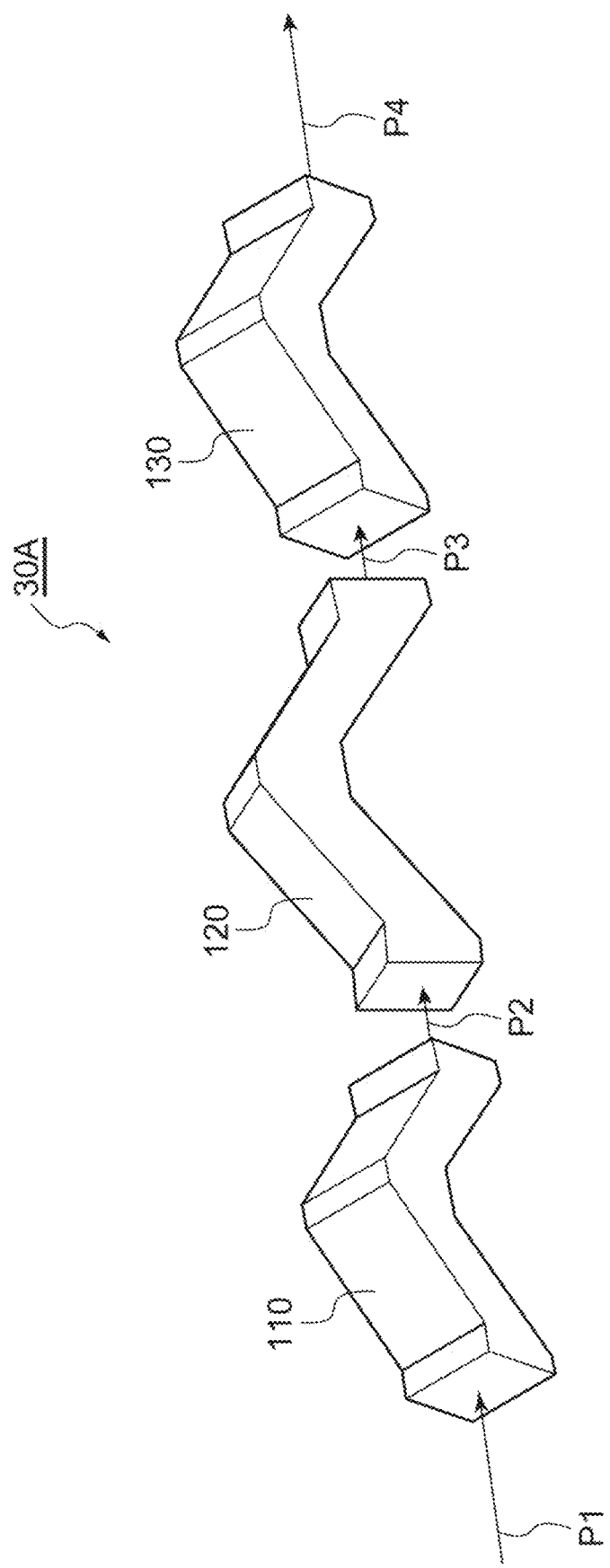
FIG. 2 is a view illustrating a configuration of a CEP adjustment unit 30A of a first configuration example.

Next, a first configuration example of the CEP adjustment unit 30 will be described. FIG. 2 is a view illustrating a configuration of a CEP adjustment unit 30A of the first configuration example. The CEP adjustment unit 30A of the first configuration example includes a quarter-wave plate 110, a half-wave plate 120, and a quarter-wave plate 130.

The quarter-wave plate 110 is a circularly polarized light pulse generation element that converts the input light pulse (terahertz wave pulse) and outputs as circularly polarized light. The quarter-wave plate 110 is preferably rotatable about an axis parallel to an input direction of a light pulse P1. When the input light pulse P1 is linearly polarized light, the quarter-wave plate 110 can output a light pulse P2 of circularly polarized light by setting a direction of the quarter-wave plate 110 such that an angle formed between a fast axis or a slow axis of the quarter-wave plate 110 and a direction of the linearly polarized light of the light pulse P1 is 45° or −45°.

When the input light pulse is not linearly polarized light, it is possible to output the light pulse P2 of circularly polarized light from a quarter-wave plate by, for example, configuring a circularly polarized light pulse generation element including a polarizer and the quarter-wave plate, and first converting the light pulse to linearly polarized light using the polarizer, and then, inputting the light pulse of the linearly polarized light to the quarter-wave plate.

The half-wave plate 120 inputs the light pulse P2 output from the quarter-wave plate 110 serving as the circularly polarized light pulse generation element. The half-wave plate 120 is rotatable about an axis parallel to the input direction of the light pulse P2. Then, the half-wave plate 120 outputs a light pulse P3 having a CEP corresponding to a rotation direction.

The quarter-wave plate 130 is a linearly polarized light pulse generation element which inputs the light pulse P3 of the circularly polarized light output from the half-wave plate 120 and outputs a light pulse P4 of linearly polarized light. The quarter-wave plate 130 is preferably rotatable about an axis parallel to an input direction of the light pulse P3.

It is preferable that each of the quarter-wave plate 110, the half-wave plate 120, and the quarter-wave plate 130 has a low wavelength dependency. Preferably, each of the quarter-wave plate 110, the half-wave plate 120, and the quarter-wave plate 130 is a prism type wave plate, a crystal stack type wave plate, a metal flat plate stack type wave plate, or the like. In particular, the prism type wave plate can apply a set phase change for light of all wavelengths in a wavelength range where a refractive index of a material can be regarded to be constant.

Figure 3:
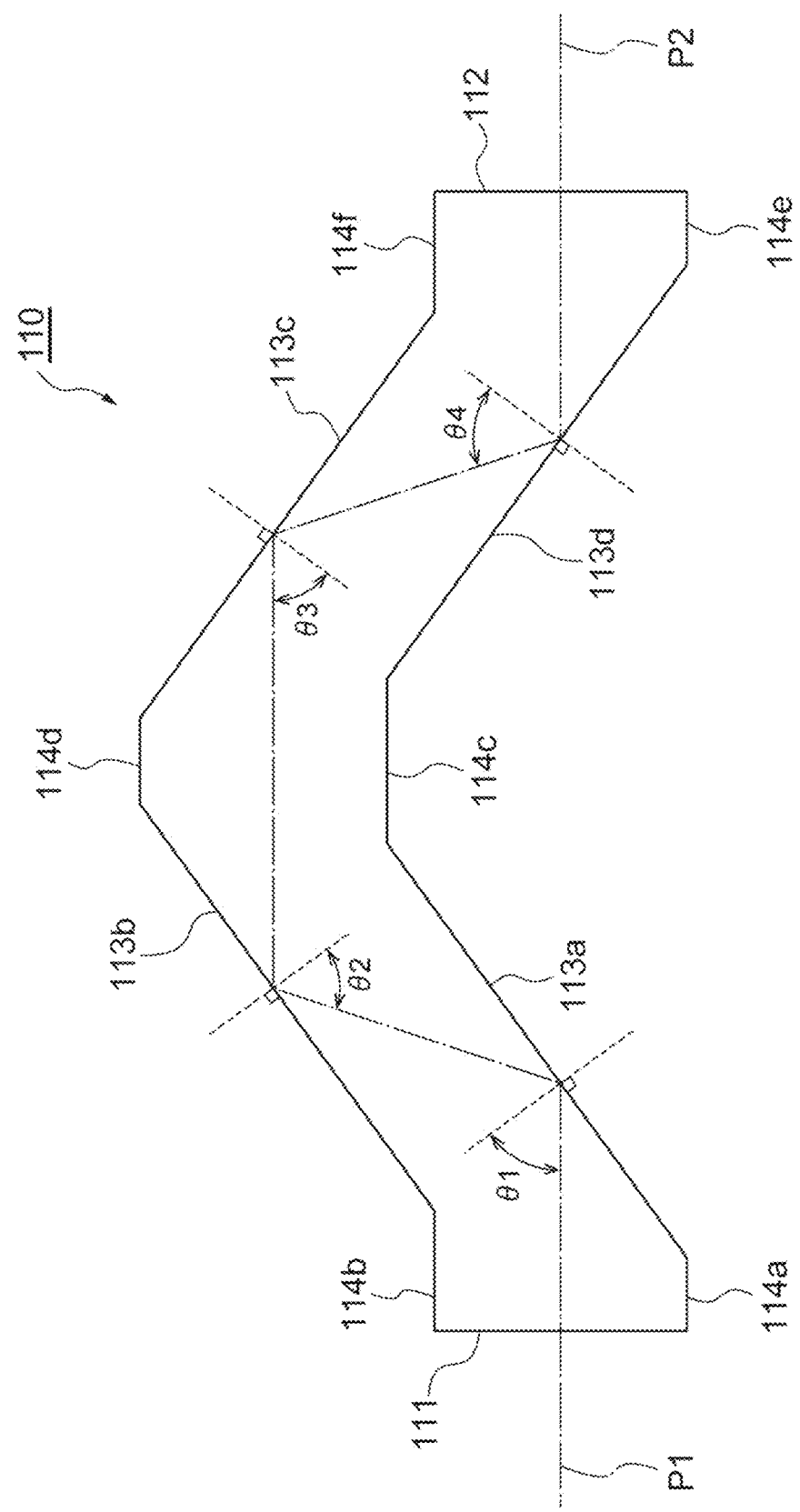
FIG. 3 is a cross-sectional view of a quarter-wave plate 110.

FIG. 3 is a cross-sectional view of the quarter-wave plate 110. The quarter-wave plate 110 illustrated in FIG. 3 is the prism type wave plate. The quarter-wave plate 110 is made of a material that is transparent and has a high refractive index in a wavelength range of the light pulse P1. When the light pulse P1 is a terahertz wave, the quarter-wave plate 110 is preferably made of silicon having a refractive index of 3.41 in the wavelength range of the terahertz wave. The quarter-wave plate 110 has an entrance surface 111, an exit surface 112, total reflection surfaces 113a to 113d, and holding surfaces 114a to 114f.

The entrance surface 111 and the exit surface 112 are parallel to each other. The light pulse P1 of the linearly polarized light is incident perpendicularly to the entrance surface 111. The light pulse incident to the entrance surface 111 is totally reflected sequentially by each of the four total reflection surfaces 113a to 113d. Then, the light pulse P2 of the circularly polarized light is emitted perpendicularly from the exit surface 112. The light pulse P1 incident on the entrance surface 111 and the light pulse P2 emitted from the exit surface 112 can be made coaxial. Therefore, a position of the light pulse P2 emitted from the exit surface 112 does not change even when the quarter-wave plate 110 is rotated about the axis. The holding surfaces 114a to 114f are surfaces that do not contribute to entrance, total reflection, or emission of light pulses and are surfaces for connection with a support member for arrangement and direction setting of the quarter-wave plate 110.

A phase difference is generated between a p-polarized component and an s-polarized component at the time of total reflection of the light pulse on each of the total reflection surfaces 113a. to 113d. The phase difference depends on incident angles θ1 to θ4 of the light pulse on the total reflection surfaces 113a to 113d and a refractive index ratio between the material of the quarter-wave plate 110 and the surrounding medium (generally, air). Therefore, the sum of phase differences between the p-polarized component and the s-polarized component generated at the time of total reflection of the light pulse at each of the total reflection surfaces 113a to 113d can be π/2 by setting appropriately these factors, and as a result, it is possible to configure the quarter-wave plate. In the same manner, a half-wave plate, a ¾ wave plate, and the like can be configured.

Next, an operation of the CEP adjustment unit 30A of the present configuration example will be described, and a CEP control method of the present configuration example will be described. It is assumed that the input light pulse P1 is linearly polarized light, a fast axis of the quarter-wave plate 110 is inclined by 45°, a fast axis of the half-wave plate 120 is inclined by α°, and a fast axis of the quarter-wave plate 130 is inclined by β°, with respect to a direction of the linearly polarized light, and a direction of linearly polarized light of the light pulse P4 output from the quarter-wave plate 130 is inclined by θ°. α and β are variable.

When the direction angle β of the quarter-wave plate 130 is changed by rotating the quarter-wave plate 130 about the axis parallel to the input direction of the light pulse P3, it is possible to change the direction angle θ of the linearly polarized light of the light pulse P4 output from the quarter-wave plate 130 according to the following Formula (1). Further, it is possible to change the CEP ($\phi_{CEP}$) of the light pulse P4 according to the following Formula (2) by changing the direction angle a of the half-wave plate 120 or the direction angle β of the quarter-wave plate 130. $\phi_{CEP0}$ is an initial value of the CEP.

$$\theta = \beta - 45° \quad (1)$$

$$\phi_{CEP} = 2\alpha - \beta - 45° + \phi_{CEP0} \quad (2)$$

Figure 4:
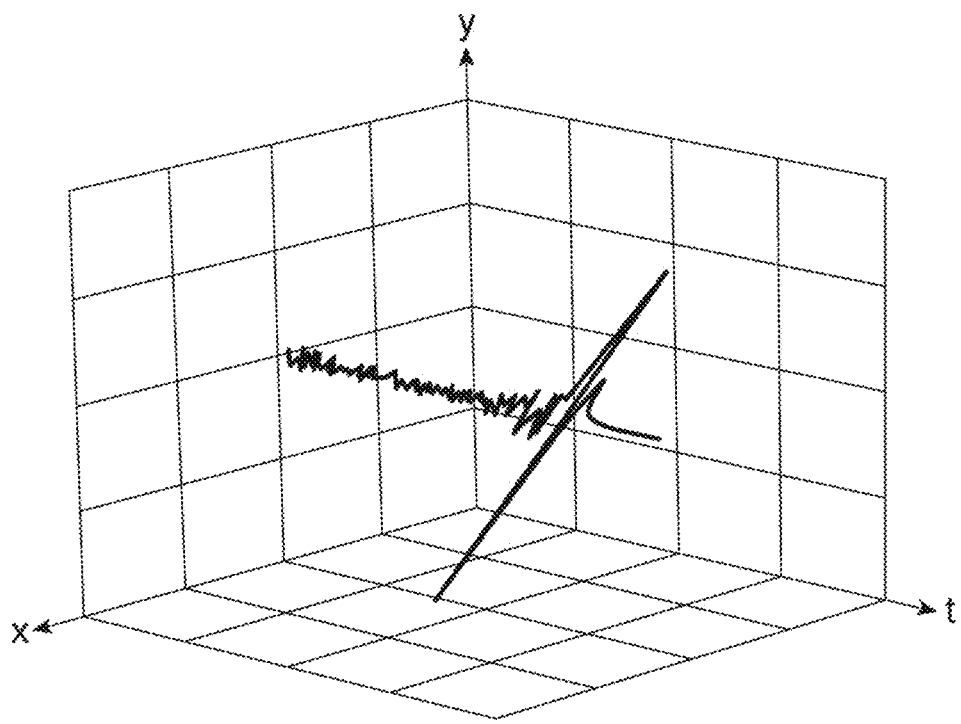
FIG. 4 is a graph illustrating a temporal change of an optical electric field of a light pulse P4 output from a quarter-wave plate 130 when β=0°.
Figure 5:
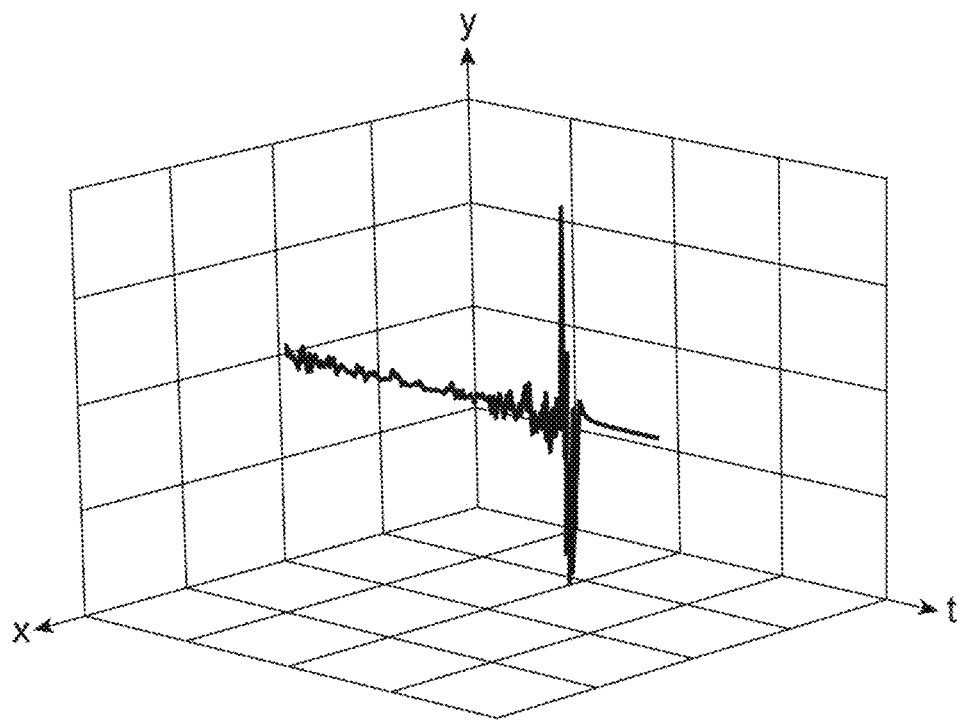
FIG. 5 is a graph illustrating a temporal change of the optical electric field of the light pulse P4 output from the quarter-wave plate 130 when β=45°.
Figure 6:
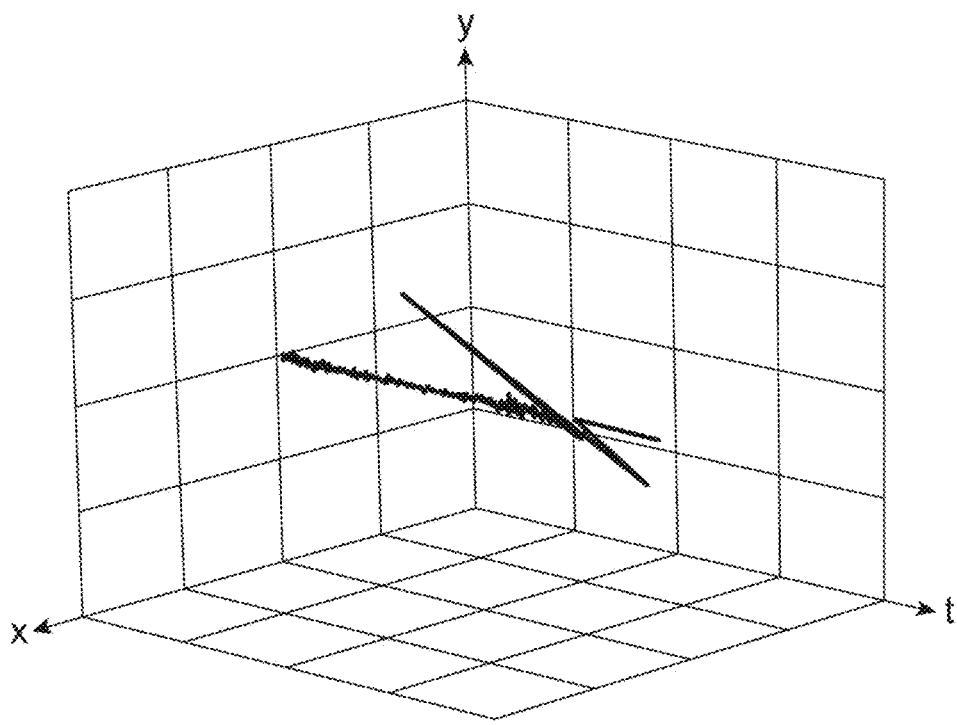
FIG. 6 is a graph illustrating a temporal change of the optical electric field of the light pulse P4 output from the quarter-wave plate 130 when β=90°.

FIG. 4 to FIG. 6 are graphs illustrating a temporal change of the optical electric field of the light pulse P4 output from the quarter-wave plate 130 when the direction angle β of the quarter-wave plate 130 is set to each value. FIG. 4 illustrates the case of β=0°, FIG. 5 illustrates the case of β=45°, and FIG. 6 illustrates the case of β=90°. Here, α is fixed to 0°. These drawings illustrate an amplitude and a direction of an optical electric field of the light pulse P4 output from the quarter-wave plate 130 at time t with two axes orthogonal to a traveling direction of the light pulse as the x-axis and the y-axis. As illustrated in these drawings, the direction angle θ of the linearly polarized light of the light pulse P4 output from the quarter-wave plate 130 changes in accordance with a change of the direction angle β of the quarter-wave plate 130.

Figure 7:
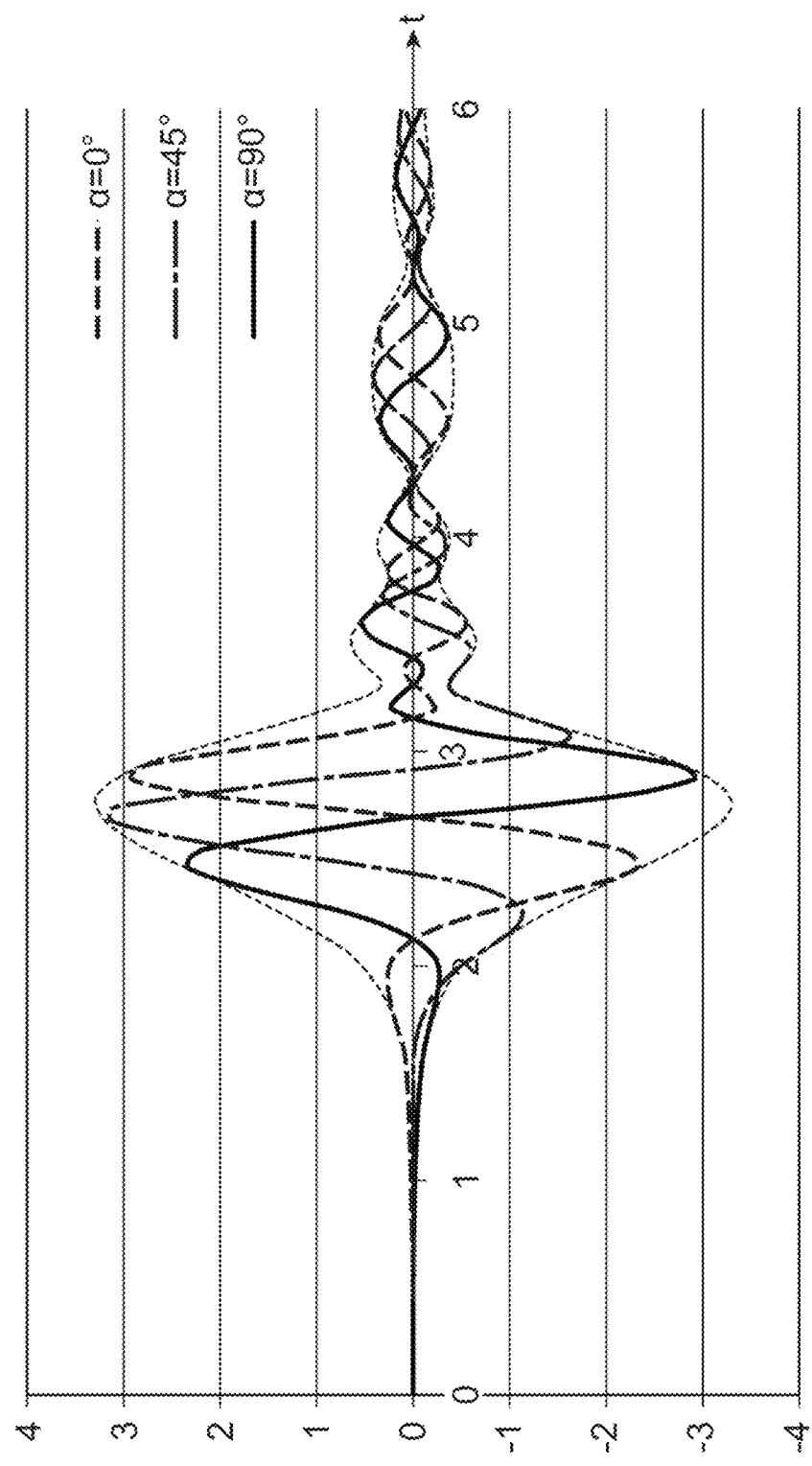
FIG. 7 is a graph illustrating a temporal change of the optical electric field of the light pulse P4 output from the quarter-wave plate 130 when a direction angle a of a half-wave plate 120 is set to each value.

FIG. 7 is a graph illustrating a temporal change of the optical electric field of the light pulse P4 output from the quarter-wave plate 130 when the direction angle α of the half-wave plate 120 is set to each value. α is set to each value of 0°, 45°, and 90°, and β is fixed to 45°. The dashed line indicates an envelope of the amplitude of the light pulse. As illustrated in FIG. 7, the CEP of the light pulse P4 output from the quarter-wave plate 130 changes in accordance with the change of the direction angle α of the half-wave plate 120.

In this manner, the direction angle θ of the linearly polarized light of the light pulse P4 output from the quarter-wave plate 130 can be controlled by adjusting the direction angle β of the quarter-wave plate 130 in the present configuration example. Further, the CEP ($\phi_{CEP}$) of the light pulse P4 can be controlled by adjustment of the direction angle a of the half-wave plate 120 in addition to adjustment of the direction angle β of the quarter-wave plate 130. In the present configuration example, the CEP of the light pulse P4 is controlled only by rotating the wave plate, and thus, it is possible to easily control the CEP of the light pulse with a simple configuration.

Here, the fast axis of the quarter-wave plate 110 may be inclined by −45° with respect to the direction of the linearly polarized light of the input light pulse P1, and a ¾ wave plate may be used in place of the quarter-wave plate 110 or the quarter-wave plate 130. In any of these cases, only the signs in the above Formula (1) and Formula (2) are different, and these cases are substantially equivalent to the above case in which the fast axis of the quarter-wave plate 110 is inclined by 45° with respect to the direction of the linearly polarized light of the input light pulse P1.

Figure 8:
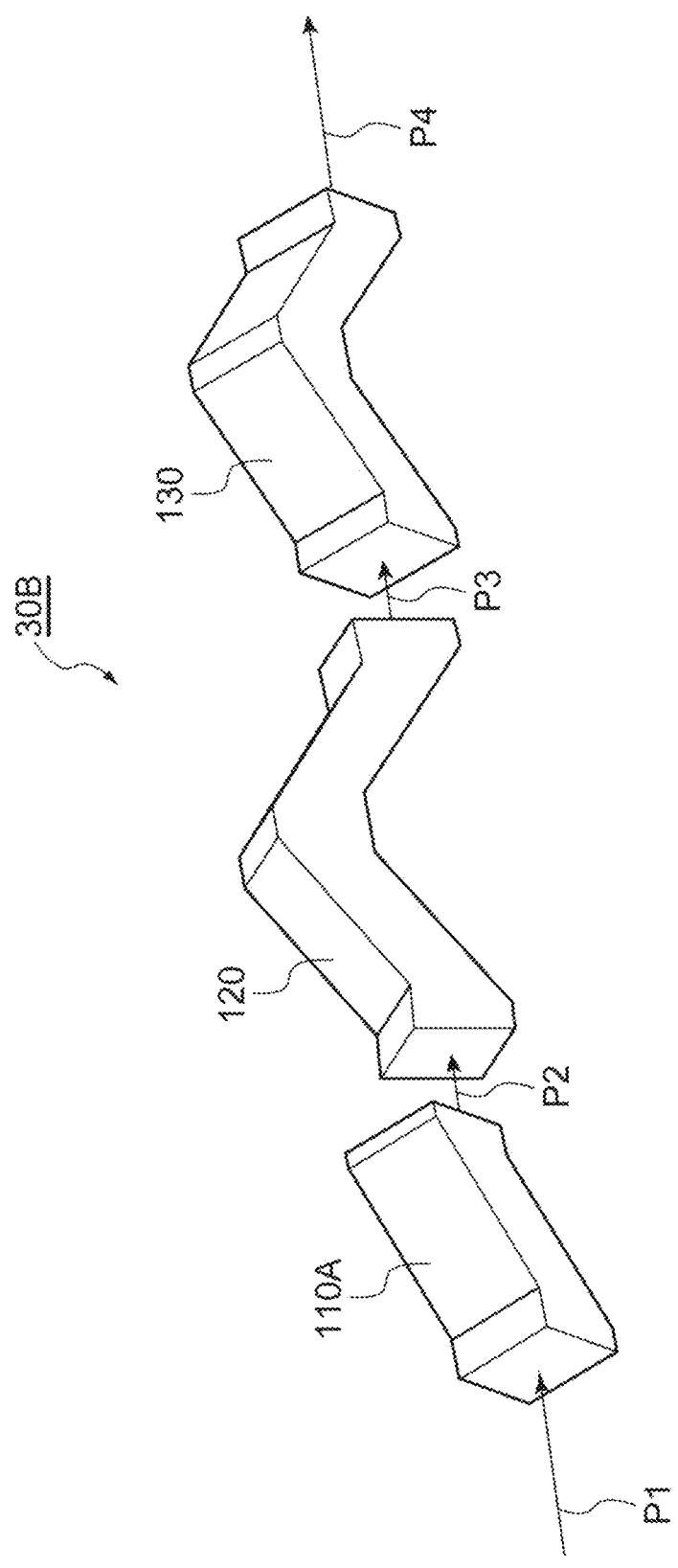
FIG. 8 is a view illustrating a configuration of a CEP adjustment unit 30B of a second configuration example.

Next, a second configuration example of the CEP adjustment unit 30 will be described. FIG. 8 is a view illustrating a configuration of a CEP adjustment unit 30B of the second configuration example. The CEP adjustment unit 30B of the second configuration example includes a quarter-wave plate 110A, the half-wave plate 120, and the quarter-wave plate 130. Compared with the configuration of the CEP adjustment unit 30A of the first configuration example illustrated in FIG. 2, the CEP adjustment unit 30B of the second configuration example illustrated in FIG. 8 is different in terms of including the quarter-wave plate 110A as the circularly polarized light pulse generation element in place of the quarter-wave plate 110.

Figure 9:
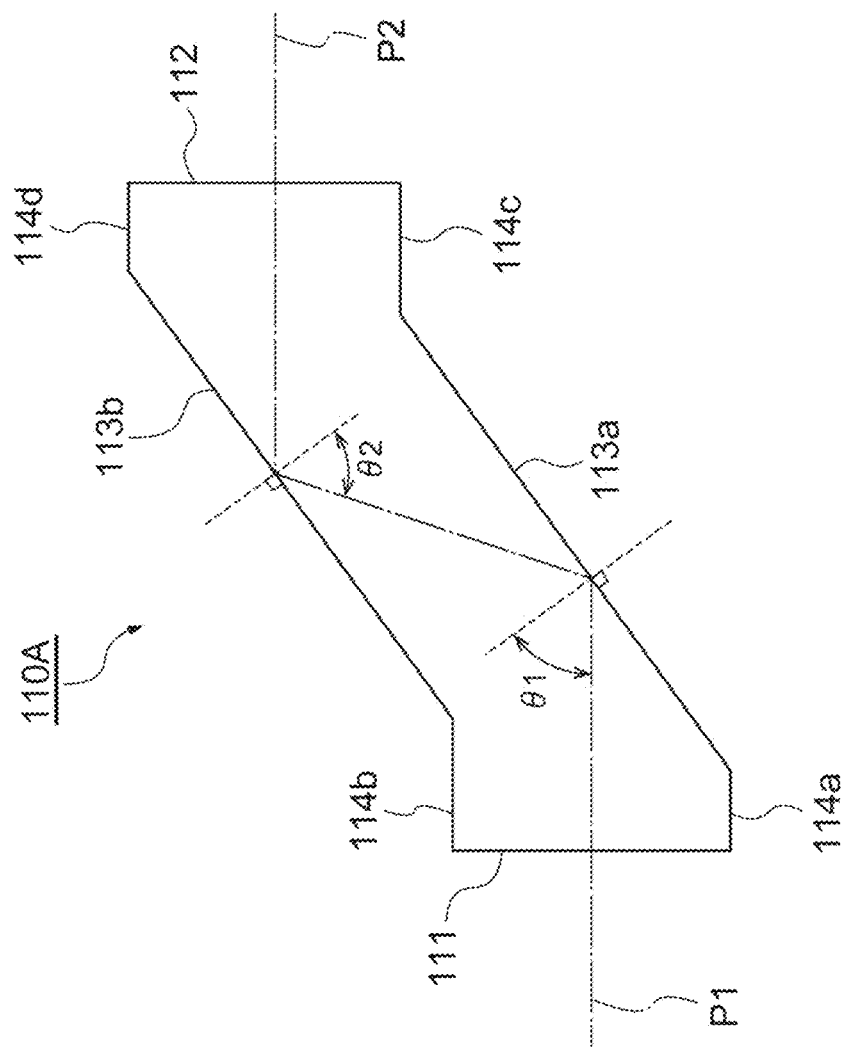
FIG. 9 is a cross-sectional view of a quarter-wave plate 110A.

FIG. 9 is a cross-sectional view of the quarter-wave plate 110A. The quarter-wave plate 110A illustrated in FIG. 9 has an entrance surface 111, an exit surface 112, total reflection surfaces 113a and 113b, and holding surfaces 114a to 114d. The entrance surface 111 and the exit surface 112 are parallel to each other. The light pulse P1 of the linearly polarized light is incident perpendicularly to the entrance surface 111. The light pulse incident to the entrance surface 111 is totally reflected sequentially by each of the two total reflection surfaces 113a and 113b. Then, the light pulse P2 of the circularly polarized tight is emitted perpendicularly from the exit surface 112. The light pulse P1 incident on the entrance surface 111 and the light pulse P2 emitted from the exit surface 112 can be made parallel to each other, but are not coaxial. Therefore, a position of the light pulse P2 emitted from the exit surface 112 changes when the quarter-wave plate 110A is rotated about the axis. The holding surfaces 114a to 114d are surfaces that do not contribute to entrance, total reflection, or emission of light pulses and are surfaces for connection with a support member for arrangement and direction setting of the quarter-wave plate 110A.

In the CEP adjustment unit 30B, it is difficult to rotate the quarter-wave plate 110A about the axis parallel to an input direction of the light pulse P1. However, it is possible to output the light pulse P2 of the circularly polarized light from the quarter-wave plate 110A by appropriately fixing a direction of a fast axis of the quarter-wave plate 110A in accordance with the direction of the linearly polarized light of the light pulse P1.

Compared with the configuration of the first configuration example, the CEP adjustment unit 30B of the second configuration example using the quarter-wave plate 110A, which is not rotatable, is preferable in terms of price, availability, and operability.

Figure 10:
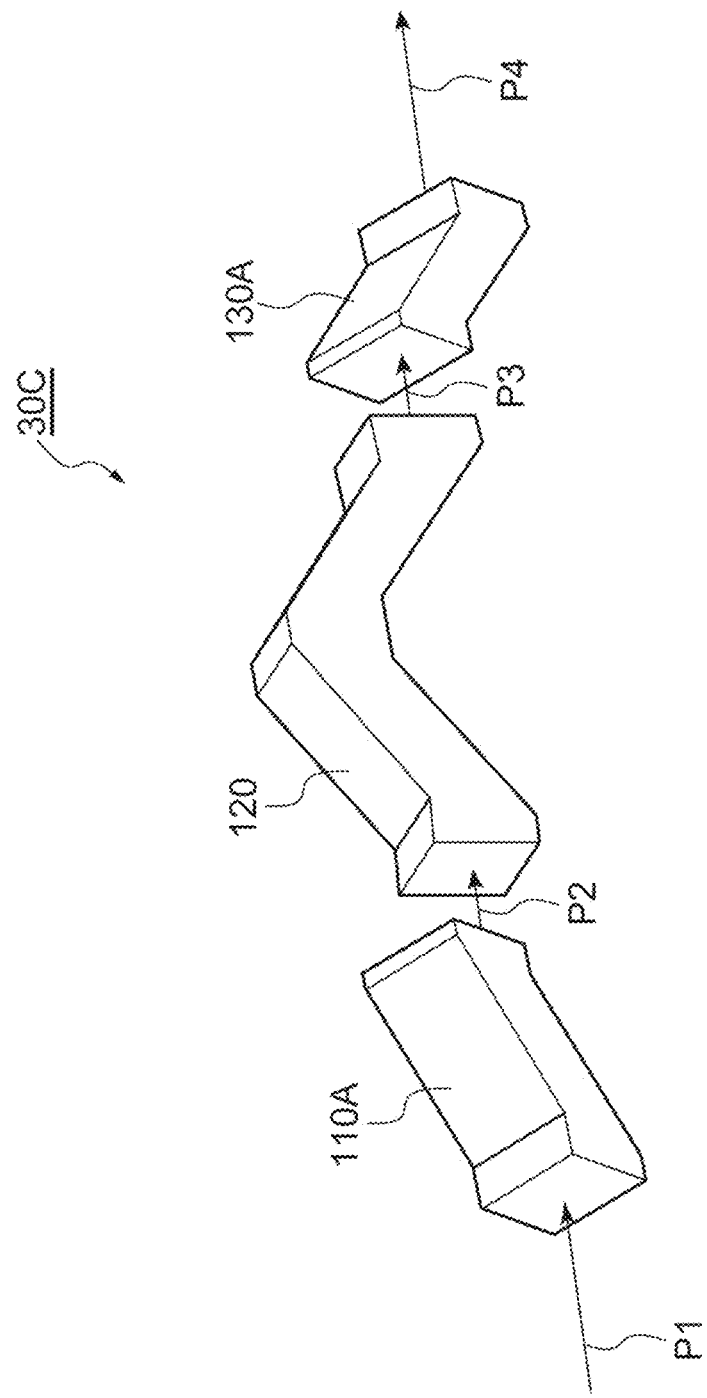
FIG. 10 is a view illustrating a configuration of a CEP adjustment unit 30C of a third configuration example.

Next, a third configuration example of the CEP adjustment unit 30 will be described. FIG. 10 is a view illustrating a configuration of a CEP adjustment unit 30C of the third configuration example. The CEP adjustment unit 30C of the third configuration example includes the quarter-wave plate 110A, the half-wave plate 120, and a quarter-wave plate 130A. Compared with the configuration of the CEP adjustment unit 30B of the second configuration example illustrated in FIG. 8, the CEP adjustment unit 30C of the third configuration example illustrated in FIG. 10 is different in terms of including the quarter-wave plate 130A in place of the quarter-wave plate 130.

The quarter-wave plate 130A has the same configuration as the quarter-wave plate 110A described above. Even in the quarter-wave plate 130A, the light pulse P3 incident on an entrance surface and the light pulse P4 emitted from an exit surface can be made parallel to each other, but are not coaxial. Therefore, a position of the light pulse P4 emitted from the exit surface changes when the quarter-wave plate 130A is rotated about the axis.

In the CEP adjustment unit 30C, not only it is difficult to rotate the quarter-wave plate 110A about an axis parallel to an input direction of the light pulse P1 but also it is difficult to rotate the quarter-wave plate 130A about an axis parallel to an input direction of the light pulse P3. That is, a direction angle β of the quarter-wave plate 130A is set to a fixed value, for example, fixed to 45°. In this case, a direction angle θ of linearly polarized light of the light pulse P4 output from the quarter-wave plate 130A coincides with a direction angle of linearly polarized light of the light pulse P1 input to the quarter-wave plate 110A.

Compared with the configuration of the second configuration example, the CEP adjustment unit 30C of the third configuration example using the quarter-wave plate 130A, which is not rotatable, is more preferable in terms of price, availability and operability.

Figure 11:
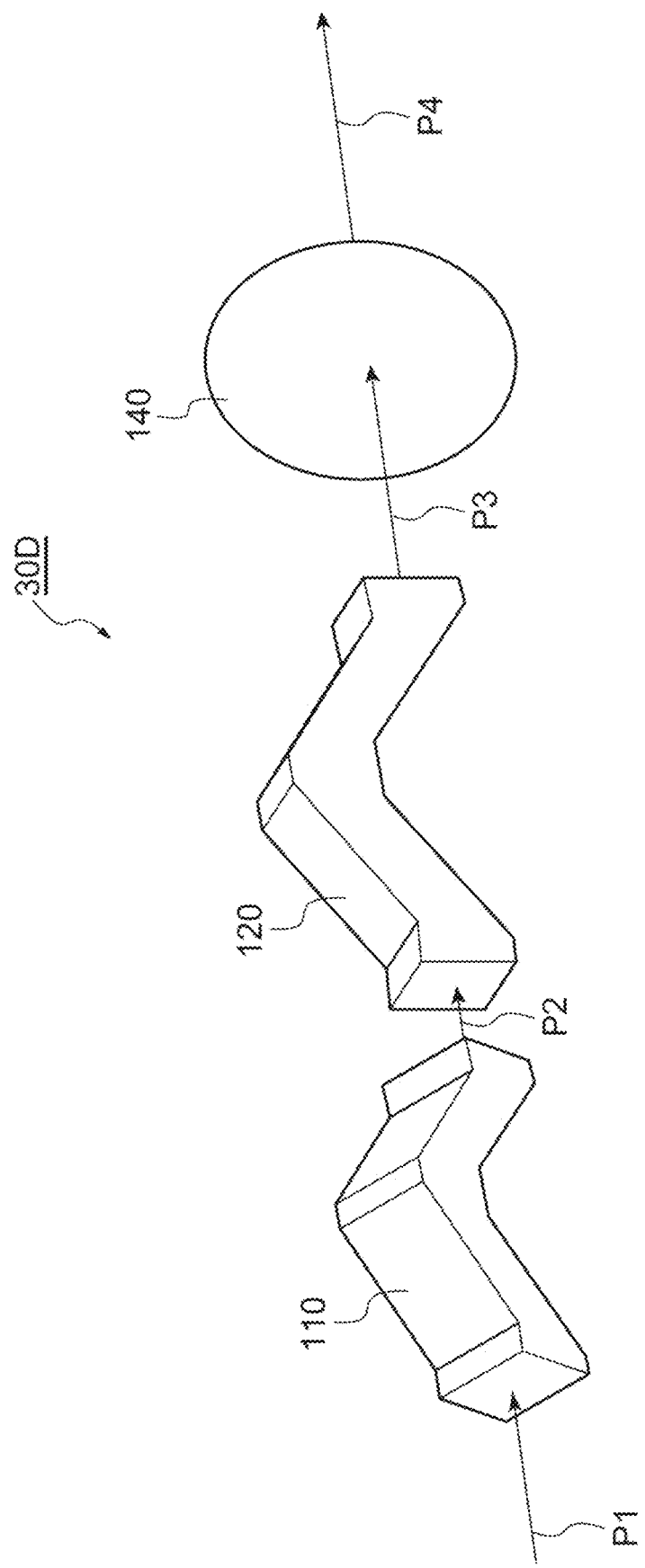
FIG. 11 is a view illustrating a configuration of a CEP adjustment unit 30D of a fourth configuration example.

Next, a fourth configuration example of the CEP adjustment unit 30 will be described. FIG. 11 is a view illustrating a configuration of a CEP adjustment unit 30D of the fourth configuration example. The CEP adjustment unit 30D of the fourth configuration example includes the quarter-wave plate 110, the half-wave plate 120, and a polarizer 140. Compared with the configuration of the CEP adjustment unit 30A of the first configuration example illustrated in FIG. 2, the CEP adjustment unit 30D of the fourth configuration example illustrated in FIG. 11 is different in terms of including the polarizer 140 in place of the quarter-wave plate 130.

The polarizer 140 is a linearly polarized light pulse generation element that inputs the light pulse P3 of circularly polarized light output from the half-wave plate 120 and outputs a linearly polarized light component of a specific direction of the light pulse P3 as the light pulse P4. The polarizer 140 is preferably rotatable about an axis parallel to an input direction of the light pulse P3.

It is assumed that the input light pulse P1 is linearly polarized light, a fast axis of the quarter-wave plate 110 is inclined by 45°, a fast axis of the half-wave plate 120 is inclined by α°, and a direction of an optical axis of the polarizer 140 is inclined by β°, with respect to a direction of the linearly polarized light, and a direction of linearly polarized light of the light pulse P4 output from the polarizer 140 is inclined by θ°. α and β are variable. In the present configuration example, θ=β, and it is possible to change the direction angle θ of the linearly polarized light of the light pulse P4 output from the polarizer 140 by changing the direction angle β of the optical axis of the polarizer 140. Further, the CEP of the light pulse P4 can be changed according to Formula (2) by changing the direction angle α of the half-wave plate 120 or the direction angle β of the polarizer 140.

In the present configuration example, the polarizer that is less expensive and easier in alignment than the quarter-wave plate is used, and thus, it is possible to control the direction angle θ and the CEP of the linearly polarized light of the light pulse P4 with high accuracy. Further, it is possible to reduce dispersion when the light pulse passes through the polarizer.

Figure 12:
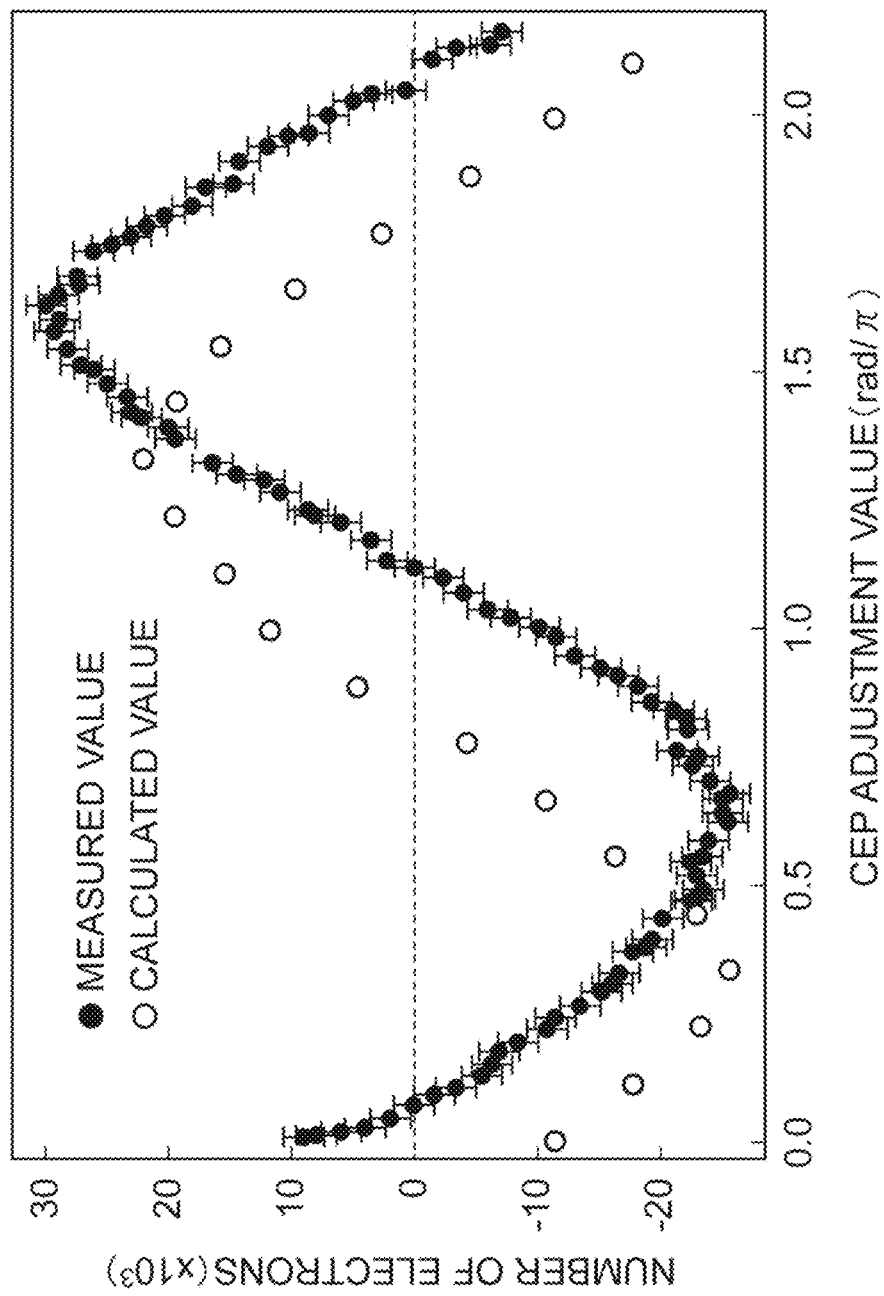
FIG. 12 is a graph illustrating a relation between the number of electrons moved by a tunnel effect during one pulse irradiation period of a terahertz wave pulse and a CEP adjustment value by a CEP adjustment unit 30.
Figure 13:
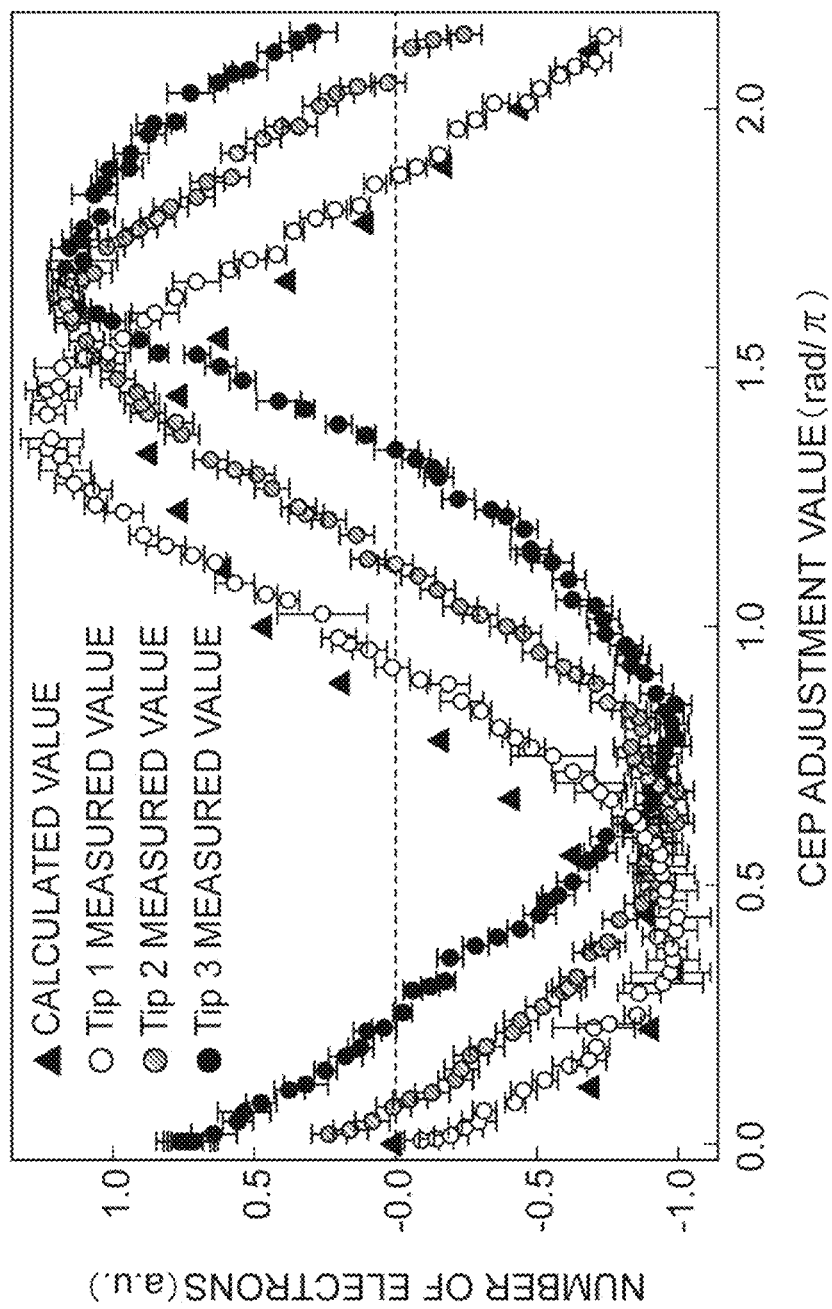
FIG. 13 is a graph illustrating the relation between the number of electrons moved by the tunnel effect during one pulse irradiation period of the terahertz wave pulse and the CEP adjustment value by the CEP adjustment unit 30.
Figure 14A:
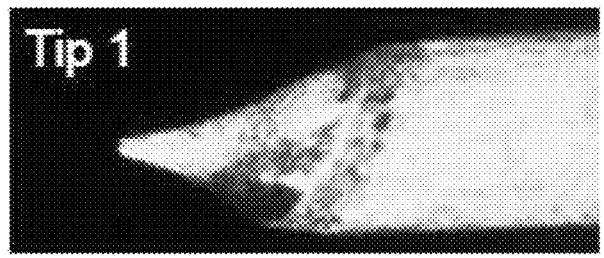
FIG. 14A to FIG. 14C are photographs of tip portions of probes (Tip 1 to Tip 3) serving as a first conductive object A.
Figure 14B:
Figure 14C:
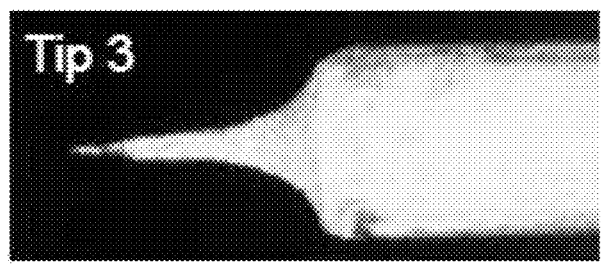

Next, a processing example in the processing unit 70 will be described. FIG. 12 and FIG. 13 are graphs illustrating a relation between the number of electrons moved by the tunnel effect during one pulse irradiation period of the terahertz wave pulse and a CEP adjustment value by the CEP adjustment unit 30. These drawings illustrate the number of moving electrons obtained from the tunnel current value measured by the current measurement unit 60, and the number of moving electrons obtained by calculation using the Simmons model based on the electric field waveform of the far field terahertz wave pulse. FIG. 13 illustrates the number of moving electrons obtained from the tunnel current value measured by the current measurement unit 60 for each of three types of probes (Tip 1 to Tip 3) used as the first conductive object A. FIG. 14A to FIG. 14C are photographs of tip portions of probes (Tip 1 to Tip 3) serving as the first conductive object A.

In this manner, the processing unit 70 can obtain a measured value and a calculated value of the number of moving electrons due to the tunnel effect for each probe. Further, the processing unit 70 can obtain a relation between each of the measured value and the calculated value of the number of moving electrons and a CEP adjustment amount.

As understood from FIG. 12, it is recognized that there is a clear difference between the number of moving electrons obtained from the tunnel current value measured by the current measurement unit 60 and the number of moving electrons obtained by calculation based on the electric field waveform of the far field terahertz wave pulse. Further, it is recognized that the difference depends on the shape of the probe as understood from FIG. 13.

In this manner, the CEP of the terahertz wave pulse focused in the gap between the first conductive object (probe) A and the second conductive object (observation object) B is sometimes different from an intended CEP, and such a difference depends on the shape of the tip of the probe. As a result, the tunnel current actually flowing between the tip of the probe and the observation object is sometimes different from an intended value. Further, an adjustment amount for a CEP of a reference is π/2 or π in the technique described in Non-Patent Document 2, but a value of the CEP of the reference is not clear.

On the other hand, in the present embodiment, it is possible to obtain the relation between the actual tunnel current and the CEP adjustment amount in the CEP adjustment unit 30 (the graph of the measured values in FIG. 12 or FIG. 13) by providing the CEP adjustment unit 30 that can arbitrarily set the CEP adjustment amount. It is possible to obtain a desired tunnel current (magnitude and direction) by setting the CEP adjustment amount in the CEP adjustment unit 30 based on the relation. That is, in the present embodiment, it is possible to accurately control the tunnel current flowing between the first conductive object and the second conductive object.

The tunnel current control apparatus of the present embodiment has been described as above. The tunnel current control method of the present embodiment uses this tunnel current control apparatus to control the tunnel current flowing between the first conductive object A and the second conductive object B. The tunnel current control method of the present embodiment is as follows.

In a generation step, the terahertz wave generation element 20 is used to generate and output a terahertz wave pulse. Next, in a CEP adjustment step, a CEP of the input terahertz wave pulse is adjusted by the CEP adjustment unit 30 configured to input the terahertz wave pulse output from the terahertz wave generation element 20 to output the terahertz wave pulse after the CEP adjustment. Then, in a focusing step, the input terahertz wave pulse is focused in the gap between the first conductive object A and the second conductive object B by the off-axis parabolic mirror M7 serving as the focusing element configured to input the terahertz wave pulse output from the CEP adjustment unit 30.

In particular, in the CEP adjustment step, the quarter-wave plate 110 serving as the circularly polarized light pulse generation element configured to input the terahertz wave pulse output from the terahertz wave generation element 20 is used to output the terahertz wave pulse as circularly polarized light. Next, the half-wave plate 120 configured to input the terahertz wave pulse output from the quarter-wave plate 110 and be rotatable about an axis parallel to an input direction is used to output a terahertz wave pulse having a CEP corresponding to a rotation direction. Then, the quarter-wave plate 130 or the polarizer 140 serving as the linearly polarized light pulse generation element configured to input the terahertz wave pulse output from the half-wave plate 120 is used to output the terahertz wave pulse as linearly polarized light.

The tunnel current control method of the present embodiment may further include a current measurement step and a processing step. In the current measurement step, the tunnel current flowing during one pulse irradiation period of the terahertz wave pulse to the gap between the first conductive object A and the second conductive object B is measured by the current measurement unit 60. In the processing step, the relation between the tunnel current measured by the current measurement unit 60 and the CEP adjustment amount in the CEP adjustment unit 30 is obtained. Then, in the CEP adjustment step, a CEP adjustment amount in the CEP adjustment unit 30 is set based on the relation obtained in the processing step.

Further, the tunnel current control method of the present embodiment may further include a branching step and a correlation detection step. In the branching step, the light pulse output from the light source 11 is branched by the branching unit 12, and one of the branched light pulses is output as a pump light pulse for generation of the terahertz wave pulse in the terahertz wave generation element 20 and the other is output as a probe light pulse. In a correlation detection step, the correlation between the terahertz wave pulse output from the CEP adjustment unit 30 and the probe light pulse output from the branching unit 12 is detected by the terahertz wave detection element 40.

The tunnel current control apparatus and the tunnel current control method according to the present invention are not limited to the above embodiments and configuration examples, and various modifications can be made.

The tunnel current control apparatus according to the above embodiment is an apparatus for controlling a tunnel current flowing between a first conductive object and a second conductive object, and includes (1) a terahertz wave generation element configured to generate and output a terahertz wave pulse; (2) a CEP adjustment unit configured to input the terahertz wave pulse output from the terahertz wave generation element, adjust a CEP of the input terahertz wave pulse, and output the terahertz wave pulse after the CEP adjustment; and (3) a focusing element configured to input the terahertz wave pulse output from the CEP adjustment unit, and focus the input terahertz wave pulse in a gap between the first conductive object and the second conductive object.

Further, in the above tunnel current control apparatus, the CEP adjustment unit includes (a) a circularly polarized light pulse generation element configured to input the terahertz wave pulse output from the terahertz wave generation element, and output the terahertz wave pulse as circularly polarized light; (b) a half-wave plate configured to input the terahertz wave pulse output from the circularly polarized light pulse generation element, be rotatable about an axis parallel to an input direction, and output the terahertz wave pulse having the CEP corresponding to a rotation direction; and (c) a linearly polarized light pulse generation element configured to input the terahertz wave pulse output from the half-wave plate, and output the terahertz wave pulse as linearly polarized light.

The above tunnel current control apparatus may be configured such that the linearly polarized light pulse generation element is rotatable about an axis parallel to an input direction of the terahertz wave pulse to the linearly polarized light pulse generation element.

The above tunnel current control apparatus may be configured to further include (1) a current measurement unit configured to measure the tunnel current flowing during one pulse irradiation period of the terahertz wave pulse to the gap between the first conductive object and the second conductive object; and (2) a processing unit configured to obtain a relation between the tunnel current measured by the current measurement unit and a CEP adjustment amount in the CEP adjustment unit.

The above tunnel current control apparatus may be configured to further include (1) a light source configured to output a light pulse; (2) a branching unit configured to branch the light pulse output from the light source, output one of the branched light pulses as a pump light pulse for generation of the terahertz wave pulse in the terahertz wave generation element, and output the other light pulse as a probe light pulse; and (3) a terahertz wave detection element configured to input the terahertz wave pulse output from the CEP adjustment unit and the probe light pulse output from the branching unit, and detect a correlation between the terahertz wave pulse and the probe light pulse.

The tunnel current control method according to the above embodiment is a method for controlling a tunnel current flowing between a first conductive object and a second conductive object, and includes (1) a generation step of, by a terahertz wave generation element, generating and outputting a terahertz wave pulse; (2) a CEP adjustment step of, by a CEP adjustment unit configured to input the terahertz wave pulse output from the terahertz wave generation element, adjusting a CEP of the input terahertz wave pulse, and outputting the terahertz wave pulse after the CEP adjustment; and (3) a focusing step of, by a focusing element configured to input the terahertz wave pulse output from the CEP adjustment unit, focusing the input terahertz wave pulse in a gap between the first conductive object and the second conductive object.

Further, in the above tunnel current control method, in the CEP adjustment step, (a) a circularly polarized light pulse generation element configured to input the terahertz wave pulse output from the terahertz wave generation element is used to output the terahertz wave pulse as circularly polarized light, (b) a half-wave plate configured to input the terahertz wave pulse output from the circularly polarized light pulse generation element, and be rotatable about an axis parallel to an input direction is used to output the terahertz wave pulse having the CEP corresponding to a rotation direction, and (c) a linearly polarized light pulse generation element configured to input the terahertz wave pulse output from the half-wave plate is used to output the terahertz wave pulse as linearly polarized light.

The above tunnel current control method may be configured such that the linearly polarized light pulse generation element is rotatable about an axis parallel to an input direction of the terahertz wave pulse to the linearly polarized light pulse generation element, and the terahertz wave pulse having the CEP corresponding to the rotation direction of the half-wave plate and a rotation direction of the linearly polarized light pulse generation element is output from the linearly polarized light pulse generation element.

The above tunnel current control method may further include (1) a current measurement step of measuring the tunnel current flowing during one pulse irradiation period of the terahertz wave pulse to the gap between the first conductive object and the second conductive object by a current measurement unit; and (2) a processing step of obtaining a relation between the tunnel current measured by the current measurement unit and a CEP adjustment amount in the CEP adjustment unit, and may be configured such that, in the CEP adjustment step, the CEP adjustment amount in the CEP adjustment unit is set based on the relation obtained in the processing step.

The above tunnel current control method may be configured to further include (1) a branching step of branching a light pulse output from a light source by a branching unit, outputting one of the branched light pulses as a pump light pulse for generation of the terahertz wave pulse in the terahertz wave generation element, and outputting the other light pulse as a probe light pulse; and (2) a correlation detection step of detecting a correlation between the terahertz wave pulse output from the CEP adjustment unit and the probe light pulse output from the branching unit by a terahertz wave detection element.

The present invention can be available as the apparatus and the method capable of accurately controlling the tunnel current flowing between the first conductive object and the second conductive object.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A tunnel current control apparatus for controlling a tunnel current flowing between a first conductive object and a second conductive object, the apparatus comprising:

a terahertz wave generation element configured to generate and output a terahertz wave pulse;

a carrier envelope phase (CEP) adjustment unit configured to input the terahertz wave pulse output from the terahertz wave generation element, adjust a CEP of the input terahertz wave pulse, and output the terahertz wave pulse after the CEP adjustment; and a focusing element configured to input the terahertz wave pulse output from the CEP adjustment unit, and focus the input terahertz wave pulse in a gap between the first conductive object and the second conductive object, wherein the CEP adjustment unit includes:

a circularly polarized light pulse generation element configured to input the terahertz wave pulse output from the terahertz wave generation element, and output the terahertz wave pulse as circularly polarized light;

a half-wave plate configured to input the terahertz wave pulse output from the circularly polarized light pulse generation element, be rotatable about an axis parallel to an input direction, and output the terahertz wave pulse having the CEP corresponding to a rotation direction; and a linearly polarized light pulse generation element configured to input the terahertz wave pulse output from the half-wave plate, and output the terahertz wave pulse as linearly polarized light.

2. The tunnel current control apparatus according to claim 1, wherein the linearly polarized light pulse generation element is rotatable about an axis parallel to an input direction of the terahertz wave pulse to the linearly polarized light pulse generation element.

3. The tunnel current control apparatus according to claim 1, further comprising:

a current measurement unit configured to measure the tunnel current flowing during one pulse irradiation period of the terahertz wave pulse to the gap between the first conductive object and the second conductive object; and a processing unit configured to obtain a relation between the tunnel current measured by the current measurement unit and a CEP adjustment amount in the CEP adjustment unit.

4. The tunnel current control apparatus according to claim 1, further comprising:

a light source configured to output a light pulse;

a branching unit configured to branch the light pulse output from the light source, output one of the branched light pulses as a pump light pulse for generation of the terahertz wave pulse in the terahertz wave generation element, and output the other light pulse as a probe light pulse; and a terahertz wave detection element configured to input the terahertz wave pulse output from the CEP adjustment unit and the probe light pulse output from the branching unit, and detect a correlation between the terahertz wave pulse and the probe light pulse.

5. A tunnel current control method for controlling a tunnel current flowing between a first conductive object and a second conductive object, the method comprising:

a generation step of, by a terahertz wave generation element, generating and outputting a terahertz wave pulse;

a carrier envelope phase (CEP) adjustment step of, by a CFP adjustment unit configured to input the terahertz wave pulse output from the terahertz wave generation element, adjusting a CEP of the input terahertz wave pulse, and outputting the terahertz wave pulse after the CEP adjustment; and a focusing step of, by a focusing element configured to input the terahertz wave pulse output from the CEP adjustment unit, focusing the input terahertz wave pulse in a gap between the first conductive object and the second conductive object, wherein in the CEP adjustment step, a circularly polarized light pulse generation element configured to input the terahertz wave pulse output from the terahertz wave generation element is used to output the terahertz wave pulse as circularly polarized light, a half-wave plate configured to input the terahertz wave pulse output from the circularly polarized light pulse generation element, and be rotatable about an axis parallel to an input direction is used to output the terahertz wave pulse having the CEP corresponding to a rotation direction, and a linearly polarized light pulse generation element configured to input the terahertz wave pulse output from the half-wave plate is used to output the terahertz wave pulse as linearly polarized light.

6. The tunnel current control method according to claim 5, wherein the linearly polarized light pulse generation element is rotatable about an axis parallel to an input direction of the terahertz wave pulse to the linearly polarized light pulse generation element, and the terahertz wave pulse having the CEP corresponding to the rotation direction of the half-wave plate and a rotation direction of the linearly polarized light pulse generation element is output from the linearly polarized light pulse generation element.

7. The tunnel current control method according to claim 5, further comprising:

a current measurement step of measuring the tunnel current flowing during one pulse irradiation period of the terahertz wave pulse to the gap between the first conductive object and the second conductive object by a current measurement unit; and a processing step of obtaining a relation between the tunnel current measured by the current measurement unit and a CEP adjustment amount in the CEP adjustment unit, wherein in the CEP adjustment step, the CEP adjustment amount in the CEP adjustment unit is set based on the relation obtained in the processing step.

8. The tunnel current control method according to claim 5, further comprising:

a branching step of branching a light pulse output from a light source by a branching unit, outputting one of the branched light pulses as a pump light pulse for generation of the terahertz wave pulse in the terahertz wave generation element, and outputting the other light pulse as a probe light pulse; and a correlation detection step of detecting a correlation between the terahertz wave pulse output from the CEP adjustment unit and the probe light pulse output from the branching unit by a terahertz wave detection element.

* * * * *